(12) United States Patent
Batur

(10) Patent No.: US 7,605,845 B2
(45) Date of Patent: Oct. 20, 2009

(54) MOTION STABILIZATION

(75) Inventor: Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 559 days.

(21) Appl. No.: 11/379,835

(22) Filed: Apr. 24, 2006

(65) Prior Publication Data

US 2006/0244836 A1 Nov. 2, 2006

Related U.S. Application Data

(63) Continuation-in-part of application No. 11/233,445, filed on Sep. 22, 2005.

(60) Provisional application No. 60/676,088, filed on Apr. 28, 2005.

(51) Int. Cl.
*H04N 5/228* (2006.01)

(52) U.S. Cl. .................................................. 348/208.6

(58) Field of Classification Search ............. 348/208.1, 348/208.99, 208.4, 208.6; 375/240.16
See application file for complete search history.

(56) References Cited

U.S. PATENT DOCUMENTS

| | | | | |
|---|---|---|---|---|
| 5,371,539 A | * | 12/1994 | Okino et al. | 348/208.6 |
| 5,563,652 A | * | 10/1996 | Toba et al. | 348/207.99 |
| 5,748,231 A | * | 5/1998 | Park et al. | 348/207.99 |
| 6,628,711 B1 | * | 9/2003 | Mathew et al. | 375/240.12 |
| 7,221,390 B1 | * | 5/2007 | Kutka | 348/208.4 |
| 2004/0201706 A1 | * | 10/2004 | Shimizu et al. | 348/208.4 |

FOREIGN PATENT DOCUMENTS

GB 2366113 A 2/2002

* cited by examiner

*Primary Examiner*—Lin Ye
*Assistant Examiner*—Nicholas G Giles
(74) *Attorney, Agent, or Firm*—Mima G. Abyad; Wade J. Brady, III; Frederick J. Telecky, Jr.

(57) ABSTRACT

Stabilization for devices such as hand-held camcorders segments a low-resolution frame into a region of reliable estimation, refines the motion vectors of that region hierarchically while at the same time updating the segmentation, finds a global motion vector for the region at high resolution, and uses the global motion vector to compensate for jitter.

7 Claims, 4 Drawing Sheets

US 7,605,845 B2

MOTION STABILIZATION

CROSS-REFERENCE TO RELATED APPLICATIONS

This application claims priority from provisional application No. 60/676,088, filed Apr. 28, 2005 and is a continuation-in-part of pending application Ser. No. 11/233,445, filed Sep. 22, 2005.

BACKGROUND OF THE INVENTION

The present invention relates to digital signal processing, and more particularly to image stabilization methods and imaging devices with electronic stabilization.

Image stabilization (IS) is the task of eliminating jitter from video sequences captured by handheld cameras. Jitter is typically due to the undesired shake of the hand during video recording, and becomes a more severe problem when higher zoom ratios are used. Eliminating jitter from video sequences has been an increasingly important problem for consumer digital cameras and camera phones. There are a few different approaches to the solution of the image stabilization problem. One particular approach is to use digital image processing techniques to eliminate jitter. This approach is generally called "digital image stabilization" (DIS).

A typical digital image stabilization method can be summarized as follows:

Step 1: Motion vector computation: Compute a number of candidate motion vectors between two frames by finding the correlations between blocks of pixels.

Step 2: Global motion vector determination: Process the candidate motion vectors from step 1 using a number of heuristics to find the global jitter motion between the two frames.

Step 3: Motion compensation: Compensate for the estimated jitter motion by digitally shifting the output image in the reverse direction of the motion.

For examples, see U.S. Pat. Nos. 5,748,231, 5,563,652, and 6,628,711.

SUMMARY OF THE INVENTION

The present invention provides digital image stabilization by estimation of jitter with segmentation of a low-resolution version of an input frame through motion vector analysis, and refinement of motion vectors hierarchically while updating the segmentation.

DESCRIPTION OF THE PREFERRED EMBODIMENTS

1. Overview

Figure 5:
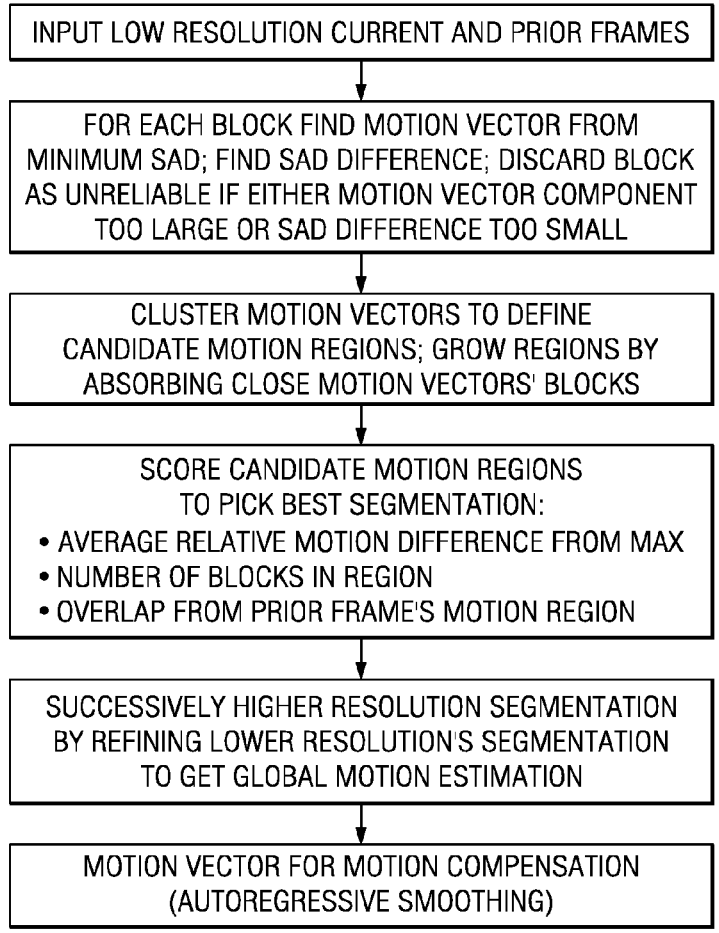
FIGS. 5-6 are flow diagrams.
Figure 6:
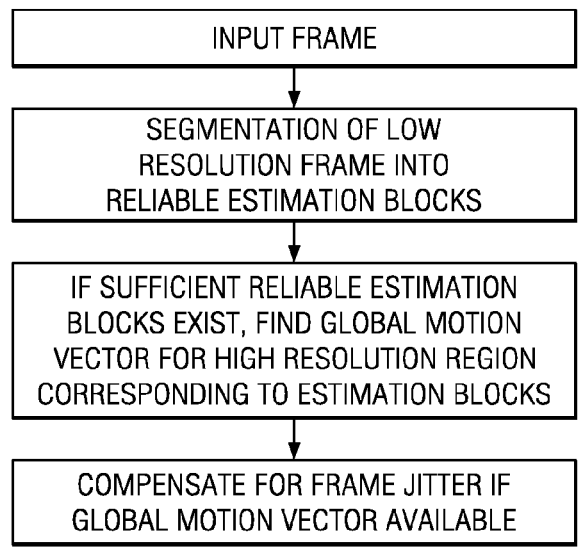

The first preferred embodiment method of digital image stabilization (DIS), such as for hand-held video devices, estimates jitter motion and compensates accordingly. FIG. 5 illustrates the jitter estimation which includes the steps of: first segment a low-resolution version of an input frame into valid (jitter motion) and invalid (other motion) blocks by analysis of motion of each block; next cluster motion vectors to find candidate motion regions, and pick the best candidate by a scoring which includes the difference of a smoothed average motion vector from the current frame's motion vectors, the number of blocks in a candidate motion region, and the number of blocks that overlap with the prior frame's picked motion region. Then extend to higher resolutions by scaling and refining the motion vectors and updating the segmentation until yielding a global motion vector for the region at highest resolution. Stabilization applies the global motion vector, if available, to motion compensate the frame. FIG. 6 is a flowchart for the overall method.

Figure 7:
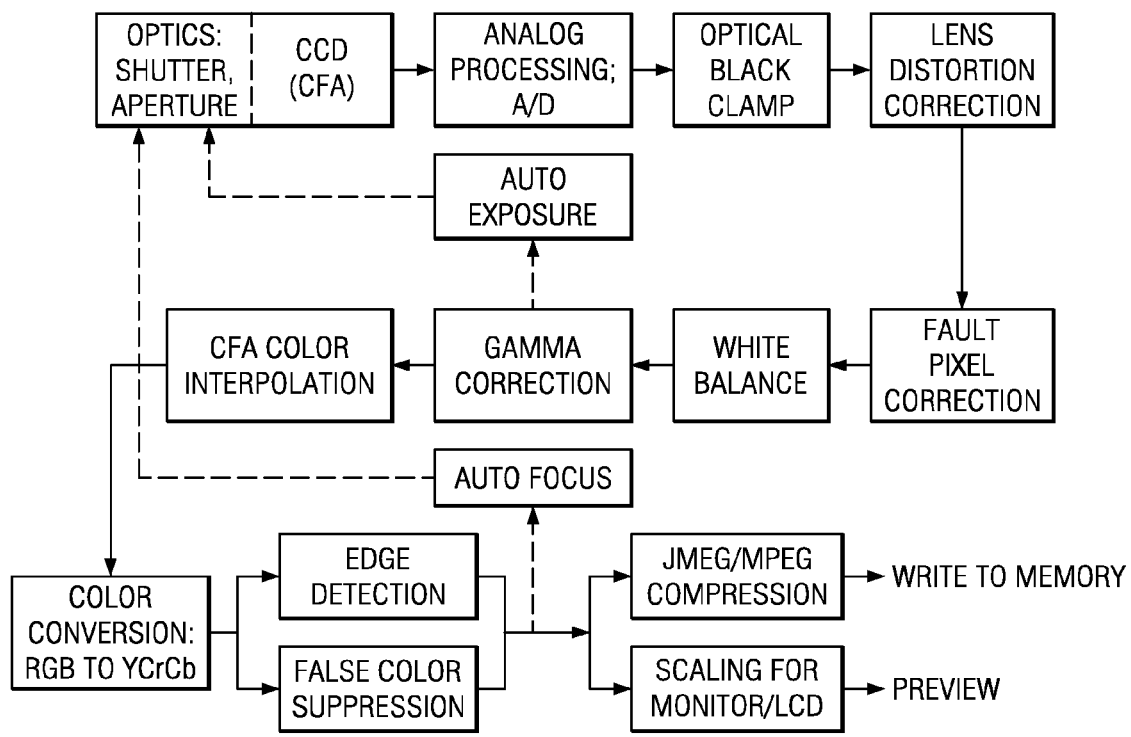

Preferred embodiment systems include camcoders, digital cameras, video cellphones, video display devices, et cetera, which perform preferred embodiment stabilization methods. FIG. 7 shows a generic image processing pipeline, and preferred embodiment stabilization could be performed in the MPEG/JPEG function and integrate with motion vector determination, although the preferred embodiment stabilization need not be encoded nor compressed. Indeed, unstabilized video could be displayed with preferred embodiment stabilization applied as part of the display process.

Figure 9:
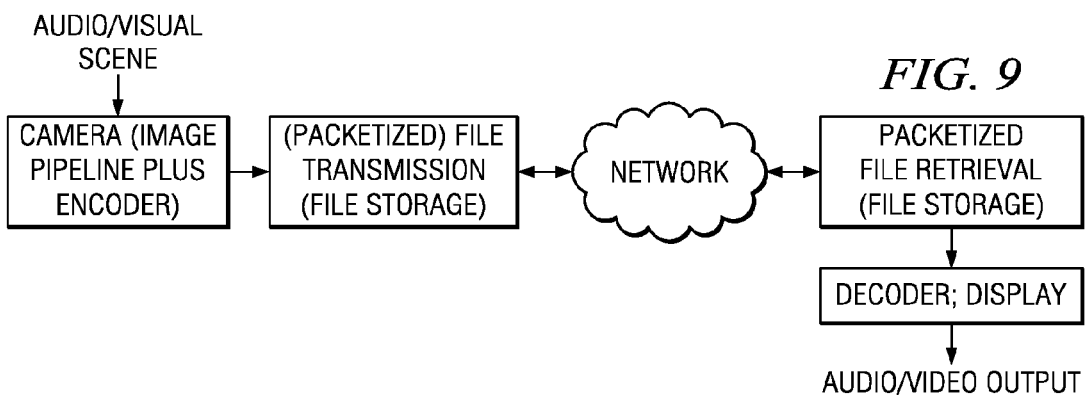
FIGS. 7-9 show image pipeline, processor, and network communication.
Figure 8:
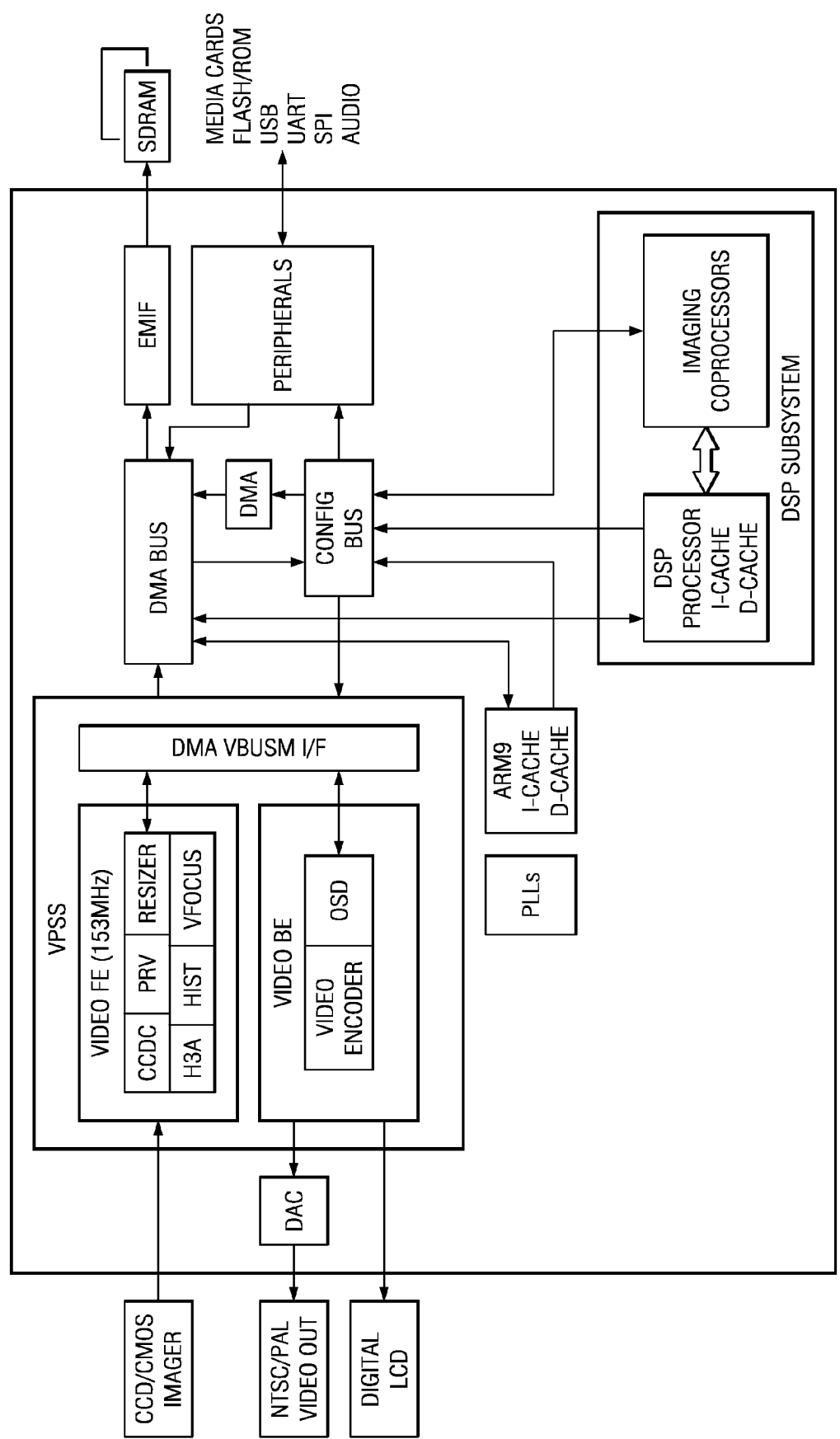

Preferred embodiment systems may be implemented with any of several types of hardware: digital signal processors (DSPs), general purpose programmable processors, application specific circuits, or systems on a chip (SoC) such as combinations of a DSP and a RISC processor together with various specialized programmable accelerators. FIG. 8 illustrates an example of a processor for digital camera applications with a video processing subsystem in the upper left. A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 9.

2. First Preferred Embodiment

The first preferred embodiment DIS approach includes the following three steps:

Step 1. Segmentation: Computation of a block-based segmentation for each frame by processing the top level (lowest resolution) of a hierarchical image representation of the frame.

Step 2. Global motion estimation: Estimation of a global motion vector for the frame using the segmentation computed in step 1 and the hierarchical image representation.

Step 3. Motion compensation: Compensation for the jitter motion in the current frame using the global motion vector computed in step 2.

The following sections provide detailed descriptions of these steps.

Step 1—Segmentation

Figure 1:
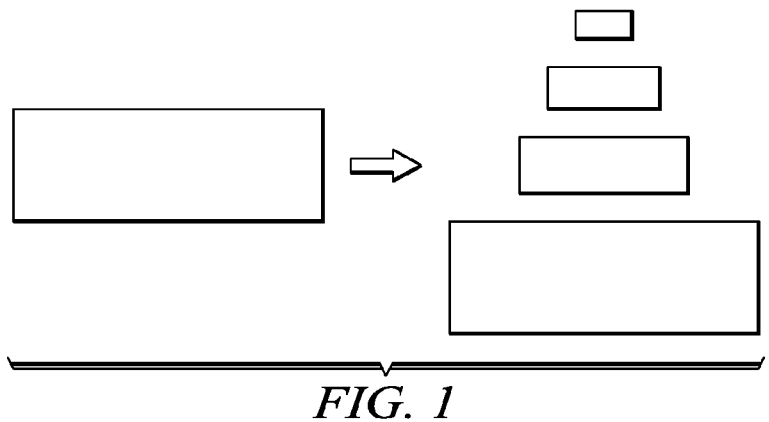
FIG. 1 illustrates a hierarchical image representation.

Process each new frame of a sequence of frames to produce a hierarchical image representation as shown in FIG. 1. This hierarchical representation consists of several versions of the original image at different resolutions. Each level of the representation is obtained by low-pass filtering a higher resolution level, such as with a Gaussian kernel, and then downsampling by a factor of 2 in each direction. This filtering and downsampling process is repeated multiple times to produce progressively lower resolution versions of the original frame. The number of levels changes depending on the input frame size. With a VGA input (640×480 pixels), for example, use a 4-level representation which gives 640×480, 320×240, 160× 120, and 80×60 images. In general, preferred embodiments use an the upper level (lowest resolution) of very roughly 80×60 pixels in size. The hierarchical representations of two frames (the current frame and the previous frame) are kept in memory for motion estimation.

Figure 2:
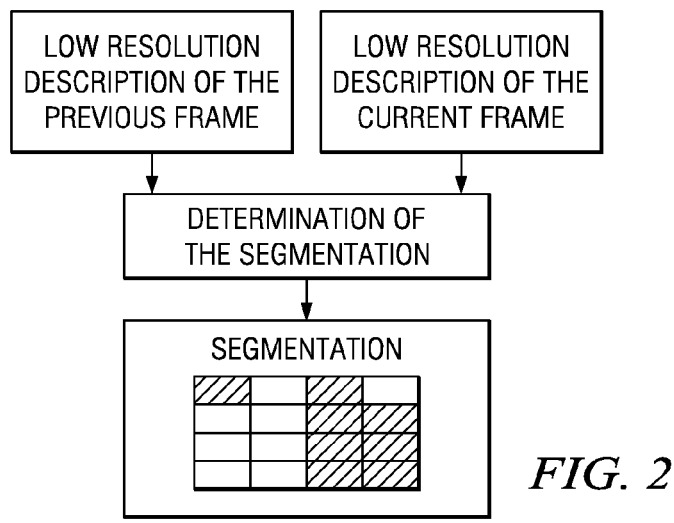
FIG. 2 shows image segmentation.

Use the top levels of the hierarchical representations of the current and previous frames to compute a block-based segmentation for the current frame. The purpose of this segmentation is to divide the frame into separate motion regions. All of the pixels in a particular region are assumed to have the same motion vector. The first preferred embodiment method uses 16 blocks as shown in FIG. 2; the top level 80×60 frame is divided into a 4×4 array of blocks, each block of size 16×12 pixels, plus border regions of width 6 or 8 pixels (used in motion vector computations). Then the blocks in the lower levels would be 32×24, 64×48, and 128×96 pixels.

To compute the segmentation, first perform an SAD-based motion estimation for each block at the top level of the hierarchical representation using the top level of the previous frame as the reference frame. Use a full-search, which involves computing SADs (sum-of-absolute-differences) for all possible motion vectors (MVs) and then pick the block's MV as the one with the smallest SAD. Explicitly, for the current frame at time t let $p^t(i,j)$ denote the (luminance) value of the pixel located at (i,j), $p^{t-1}(m, n)$ denote the previous frame pixels, and MV=[MVx, MVy] denote a possible motion vector for a block:

$$SAD(MV) = \sum_{(i,j) \in block} |p^t(i, j) - p^{t-1}(i + MVx, j + MVy)|$$

Since this process is performed using two small, low-resolution frames, the computational complexity is low. Once the minimum SAD is found, compute a reliability score using four neighbors of the minimum SAD in the vertical and horizontal directions as follows. Let S denote the minimum SAD, and St, Sb, Sr, and Sl denote the top, bottom, right, and left neighbors of the minimum SAD, respectively; that is, if V=[Vx, Vy] is the block motion vector giving the minimum S, then St is the SAD for motion vector [Vx, Vy−1], Sb is the SAD for motion vector [Vx, Vy+1], and so forth. Compute the sum (St−S)+(Sb−S)+(Sr−S)+(Sl−S), which we call the SAD difference. This is a measure of the texture content of the block and shows the reliability of its MV.

Once the MVs are available for the blocks, cluster them to identify the motion regions. Before proceeding to clustering, first remove the least reliable MVs. To identify the least reliable MVs, use the following two constraints:

1) if the horizontal or vertical amplitude of the MV is larger than a certain threshold, mark the MV as unreliable. Typical values for the threshold are in the range from 2 to 5.

2) if the SAD difference of the block is smaller than a certain threshold, mark its MV as unreliable. The threshold could be the number of (8-bit) pixels in one block divided by 2; thus for the 16×12 blocks, the threshold would be 96.

After the unreliable MVs are removed, find the candidate motion regions by clustering the MVs where each cluster includes identical MVs; that is, a candidate motion region consists of all of the blocks with same (reliable) MV. The number of clusters will be equal to the number of distinct MVs. Each MV cluster now corresponds to a candidate motion region.

Next, grow each candidate motion region by absorbing regions with MVs that do not belong to that region as follows. If the vector-space distance between a MV and every MV in a candidate motion region is less than or equal to 1, absorb that MV's block into the candidate motion region. During this process, some blocks may be included in more than one region. In other words, candidate motion regions may overlap.

Among all available candidate motion regions, find the best region to be used for video stabilization by computing a score for each region as follows:

Total score=relative motion score+size score+overlap score

To compute the relative motion score, first compute the relative motion for each region. For each block in a region, compute the relative motion between the object (in the block) and the camera by accumulating MVs over time using an autoregression of the following form:

$$R_j^t = \alpha R_j^{t-1} + (1-\alpha) V_j^t$$

where $R_j^t$ is the relative motion for the $j^{th}$ block in the $t^{th}$ frame, α is the accumulation coefficient, and $V_j^t$ is the block motion vector in the $t^{th}$ frame. A first preferred embodiment uses α equal to 0.8. This equation implements a low-pass filter for $V_j^t$. Once the relative motion for each block is available, find the relative motion for each candidate motion region by averaging the relative motions of all of the blocks in that region. Given the relative motion for each region, the relative motion score is computed as follows:

relative motion score=min((maxRelMotV−relMotV), (maxRelMotH−relMotH))

where maxRelMotV and maxRelMotH are the maximum allowed relative motions in the vertical and horizontal directions, and relMotV and relMotH are the relative motions of the current block in the vertical and horizontal directions. Typical values for maxRelMotV and maxRelMotH are in the range from 2 to 5. If the relative motion score for a motion region is negative, mark that region as unreliable and do not consider it any further.

Size score is computed by multiplying the number of blocks in the region with a constant. The first preferred embodiment uses 0.1 as the constant.

Overlap score is computed by multiplying a constant with the number of blocks in the region that overlap with the previous frame's segmentation. For the constant, the first preferred embodiment uses 0.4.

Once all cluster scores are available, the cluster with the highest score is chosen for video stabilization. If there are no clusters that survive at this point (because they all have negative scores), disable video stabilization for the current frame.

If the selected cluster has too many blocks, it may be made smaller for computational complexity reasons. To reduce the number of blocks, eliminate the blocks that have the smallest SAD differences.

Step 2—Global Motion Estimation

Figure 3:
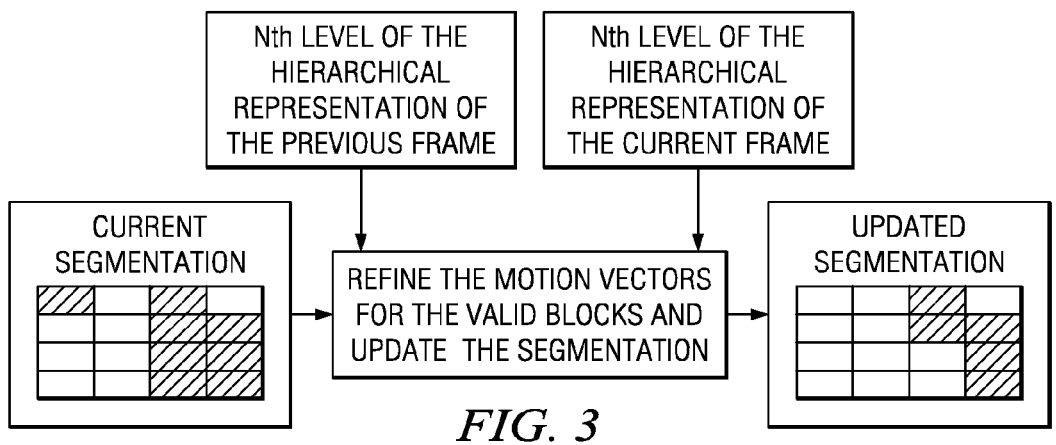
FIG. 3 show global motion estimation.

Proceed towards lower levels (higher resolutions) of the hierarchical representation. At each level, first do motion estimation for the blocks that are marked valid in the segmentation (from higher level). Motion estimation refines the MVs to higher accuracy; see FIG. 3. As the accuracy of the motion information increases, motion regions that were previously undistinguishable at a lower resolution can now be separated. So, using the new motion vectors, update the current segmentation. To update the segmentation, use a procedure similar to the one that was used at the top level, but this time use only the blocks that are marked valid in the current segmentation. First cluster the refined MVs so that each cluster has identical MVs. Then, grow each cluster to find candidate motion regions. During the growth process, if the largest distance between the new MV and the MVs in the cluster is smaller than or equal to 1, absorb the MV into the cluster. Note that the threshold 1 at the current level corresponds to a threshold of 0.5 at the prior upper level. As more accurate motion information at lower levels of the hierarchical representation appears, the separation of the motion regions proceeds with higher accuracy. Once the candidate motion regions are found, compute the total score for each candidate motion region and pick the best cluster for video stabilization. This procedure is the same as the procedure used at the top level. If the selected cluster is too large, the least reliable blocks can be eliminated to reduce motion estimation complexity. Use the SAD difference to identify the least reliable blocks.

Repeat the above procedure at successively lower levels of the hierarchical representation. At the lowest level, once the MVs are clustered, do not grow the motion regions; just compute their total scores and pick the best one for video stabilization. Since regions don't grow at the lowest level, the cluster that survives should have blocks with identical MVs. This motion vector is the global MV that will be used to stabilize the frame.

If at any point during the global motion estimation process the blocks run out, then the current frame is not suitable for motion estimation, so disable video stabilization. Disabling video stabilization means that the cropping window location won't be updated in the current frame.

Step 3—Motion Compensation

Figure 4:
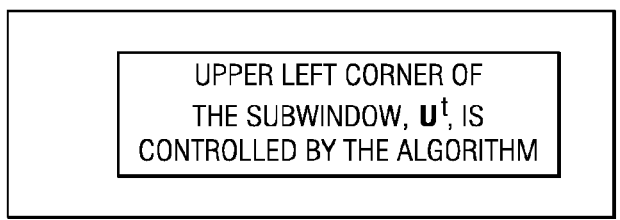
FIG. 4 illustrate compensation for motion.

For each frame, the preferred embodiment method crops a subwindow from the image and shows it to the viewer as illustrated in FIG. 4. If this subwindow is moved appropriately in the reverse direction of the (estimated) jitter motion, the viewer does not observe the jitter. Use the following equation to move the subwindow:

$$U^t = K^t U^{t-1} - W^t$$

where $U^t$ represents the coordinates of the upper left corner of the subwindow in the current frame, $W^t$ is the estimated global MV for the current frame, and $K^t$ is an adaptive accumulation coefficient. This equation is applied to the vertical and horizontal coordinates of the upper left corner of the subwindow separately. The reference point for $U^t$ is the neutral position for the window in the middle of the frame such that $U^t$ is zero in the first video frame where the window has not moved from its initial location. $K^t$ linearly changes between a minimum and a maximum value depending on how far the subwindow is from its neutral position. The value of $K^t$ is computed as follows:

$$K^t = [(K_{min} - K_{max})\|U^{t-1}\|/U_{max}] + K_{max}$$

where $\|U^{t-1}\|$ is the sum of the absolute values of the components of $U^{t-1}$, $U_{max}$ is the maximum allowed deviation for the subwindow from it neutral position, $K_{max}$ is the maximum value for $K^t$, and $K_{min}$ is the minimum value for $K^t$. The first preferred embodiment uses $K_{max}=1$ and $K_{min}=0.85$.

3. Modifications

The preferred embodiments can be modified in various ways while retaining one or more of the features of low-resolution frame segmentation, motion vector refinement for the segmented region at higher resolution, updating of the segmentation and as higher resolution motion information is obtained, and the window position update with the global motion vector.

For example, the array of blocks for segmentation could be varied depending upon the number of pixels in the lowest resolution version of the frame (e.g, 3000 to 8000 pixels) and the aspect ratio (e.g., 4×5 aspect ratio of portraits, 4×3, 16×9 for HDTV, et cetera), such as a 3×3 array for the 4×3 aspect ratio with 3000 pixels and an 8×5 arrays for the 16×9 aspect ratio with 8000 pixels. That is, from 9 to 40 blocks is convenient. The stabilization could be performed on pictures generally; that is, the stabilization also applies on a field basis with either separate or combined top field and bottom field blocks. The lowest resolution full search could be replaced with a limited search. The SAD measurement could be replaced by other measurements of a motion vector prediction error such as SSD (sum of squared differences) or by sub-sampled SADs. One or more levels of the hierarchical representation could be skipped during refinement (with corresponding adjustments), and different methods of low-pass filtering and downsampling could be used to define the hierarchy. When the motion estimation process reaches the highest resolution of the hierarchical representation, it could continue to refine the motion vectors and update the segmentation for sub-pixel resolutions such as half-pel, quarter-pel, etc. If a low-resolution version of the input frame is already available, such as in the low-pass-low-pass of a wavelet decomposition, that version could be used to speed up the process of creating the hierarchical representation. A different equation that takes into account the current location could be used to compute the location of the stabilized subwindow. The various sizes, thresholds, accumulation coefficients, et cetera could be varied.

What is claimed is:

1. A method of digital image stabilization, comprising the steps of:
   providing a low-resolution version of an input digital picture;
   partitioning said low-resolution version into reliable blocks and unreliable blocks according to motion prediction errors;
   aggregating said reliable blocks into candidate motion regions according to block motion vectors for said reliable blocks;
   finding a segmentation of said low-resolution version from said candidate motion regions, wherein said finding a segmentation includes comparing scores for said candidate motion regions where said score for a region includes a difference of an average relative block motion from a maximum, a measure of the number of said reliable blocks in a region, and a measure of the number of said reliable blocks in a region which are also in a segmentation for a low-resolution version of a prior picture;
   updating said segmentation to a segmentation of said input picture;
   finding a global motion vector for said input picture from said segmentation of said input picture; and compensating for jitter motion in said input picture using said global motion vector.

2. The method of claim 1, wherein said updating said segmentation includes a first updating to a segmentation of a middle-resolution version of said input picture plus a second updating of said segmentation of a middle-resolution version to said segmentation of said input picture where said middle-resolution version has (i) higher resolution than said low-resolution version and (ii) lower resolution than said input picture.

3. A method of jitter compensation for video frames, comprising the steps of:
providing a resolution hierarchy, $F_1, F_2, \ldots F_N$, for an input frame with N an integer greater than 2 and said input frame equal to $F_N$;
partitioning said $F_1$ into blocks plus border regions;
for each of said blocks, (i) computing a block motion vector, (ii) computing prediction errors for said block motion vector and for motion vectors differing by 1 from said block motion vector, and (iii) when a sum of differences of said prediction errors exceeds a first threshold, designating said each of said blocks as a reliable block;
aggregating said reliable blocks into candidate motion regions according to block motion vectors for said reliable blocks;
selecting a segmentation for $F_1$ from said candidate motion regions by comparing said regions according to (i) the number of blocks, (ii) the number of blocks corresponding to blocks in a segmentation of a hierarchy of a prior frame, and (iii) an average of relative block motion vectors, wherein said segmentation comprises comparing scores for candidate motion regions where said score for a region includes a difference of an average relative block motion from a maximum, a measure of the number of said reliable blocks in a region, and a measure of the number of said reliable blocks in a region which are also in a segmentation for a low-resolution version of a prior picture;
for n=2, . . . , N, selecting a segmentation for $F_n$ by repeating the above steps for blocks corresponding to blocks of said segmentation of $F_{n-1}$;
computing a global motion vector from said segmentation of $F_N$; and
using said global motion vector to jitter compensate said input frame.

4. The method of claim 3, wherein said relative block motion vector is a lowpass filtering of said block motion vector.

5. The method of claim 3, wherein said jitter compensate includes an adaptive accumulation of said global motion vector to define a location for a subwindow in said input frame.

6. The method of claim 3, wherein said partitioning into blocks gives between nine and forty blocks.

7. A video camera, comprising:
picture capturer;
a jitter estimator coupled to said picture capturer, said jitter estimator including:
a resolution hierarchy downsampler;
a segmenter coupled to said downsampler, said segmenter operable to sequentially find a segmentation plus motion vector for each level of a resolution hierarchy computed from an input picture, wherein said segmentation comprises comparing scores for candidate motion regions where said score for a region includes a difference of an average relative block motion from a maximum, a measure of the number of said reliable blocks in a region, and a measure of the number of said reliable blocks in a region which are also in a segmentation for a low-resolution version of a prior picture;
a global motion vector determiner coupled to said segmenter;
a memory for a resolution hierarchy of a prior frame, said memory coupled to said jitter estimator; and
jitter motion compensater coupled to said jitter estimator.

* * * * *

UNITED STATES PATENT AND TRADEMARK OFFICE
CERTIFICATE OF CORRECTION

PATENT NO. : 7,605,845 B2 Page 1 of 1
APPLICATION NO. : 11/379835
DATED : October 20, 2009
INVENTOR(S) : Aziz Umit Batur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Fifth Day of October, 2010

David J. Kappos
*Director of the United States Patent and Trademark Office*